Patented Sept. 14, 1943

UNITED STATES PATENT OFFICE 2,329,236

RESIN AND COMPOSITION CONTAINING THE SAME

Gellert Alleman, Wallingford, and John Harold Perrine, Prospect Park, Pa., assignors to Sun Oil Company, Philadelphia, Pa., a corporation of New Jersey No Drawing. Application May 4, 1940, Serial No. 333,423

9 Claims. (Cl. 260—75)

This invention relates to resins and compositions containing the same and more particularly relates to resins of the alkyd type involving reaction products of polybasic acids with polyhydric alcohols.

Alkyd resins, typified by those formed through the reaction of glycerol with phthalic anhydride with addition of modifying agents, have entered into widespread use in lacquers and other coating compositions, in the impregnation of fabrics, wood and paper, in bonding and adhesive compositions, in modification of other resins and in many other fields.

The resins made from glycerine and phthalic anhydride alone are generally inapplicable and must be modified by the presence of other ingredients known as "modifiers." Generally speaking, most modified alkyd resins are compatible with nitrocelluloses of various viscosities, but are not usually compatible with cellulose acetates.

It is the object of the present invention to provide modified alkyd resins which may be inexpensively prepared from the standpoint of both cost of materials and time consumed in the carrying out of the reaction and which are compatible with nitrocelluloses and also with cellulose acetates of both high and low viscosities, and are in general suitable for all other uses of alkyd resins.

In accordance with the present invention, the modification of the alkyd resin is accomplished by the use of metallic salts of certain acids derived from petroleum. As is pointed out in Angstadt Patent No. 1,931,880, there are present in the asphaltic still bottoms obtained in the distillation of topped crude to produce lubricating oils (see Pew Patent 1,761,153) certain acids of high molecular weight. These acids belong to the series $C_nH_{2n-x}O_2$, in which $x$ is 4, 6, 8 or 10 and in which $n$ may vary from 14 to 29. A mixture of such acids is produced commercially, for example, in accordance with the method of Terrell et al., Patent No. 8,056,913. The acids thus produced are predominantly those of the above formula in which $x$ is 8 or 10, though there are present additionally acids having $x$ equal to 4 and 6. Acids of the same series in which $x$ equals primarily 4 or 6 may be obtained in accordance with Alleman Patent No. 1,694,461 from the alkali precipitate formed during the refining treatment of petroleum lubricating oil.

In general, the above acids have acid numbers varying from about 100 to about 230, molecular weights from about 220 to about 440 and refractive indices from about 1.4900 to about 1.5135 ($n_D$ 20° C.). The acids are monobasic and of carbocyclic, though not aromatic, type apparently containing five members rings and are substantially fully saturated. (Iodine number negligible.) They apparently contain no hydroxy or keto groups, being non-reactive with acetyl chloride and sodium bisulphite. These acids are distillable between about 125° C. and 330° C. at 2 mm. They have only slight odor which is not unpleasant. Their mixture solidifies at about —50° C. The commercial acids generally contain some hydrocarbons as impurities, reducing the acid number of the mixture, but the presence of these hydrocarbons does not affect their applicability in the present invention.

The present invention will be best understood by considering the specific formation of an alkyd resin in accordance therewith.

Thirty parts of glycerine are mixed with seventy parts of phthalic anhydride and three parts of the cobalt salt of a mixture of the above carbocyclic acids produced in accordance with Terrel et al. Patent 2,056,913, and having an acid number of 132. The reaction is carried out at about 200° C. for a period of fifteen minutes, preferably under pressure, whereupon, after removal of the steam which is formed, the entire residue consists of a resin which, when cooled is of a light honey-like color and hard and brittle, generally resembling, in its physical properties, rosin. This resin is soluble in all the usual lacquer solvents.

The cobalt salt may be prepared in accordance with our application Serial No. 215,296, filed June 26, 1938. There may be substituted therefor the salts of other metals prepared as described in said application, for example, the calcium, barium, zinc, lead, magnesium, manganese, copper, chromium, nickel or aluminum salts. The resin formed in any case is of a generally similar nature.

In carrying out the above reaction or reactions using similar or other materials in different proportions, the reaction should be stopped at a stage at which the resin is soluble in lacquer solvents. The reaction should be stopped before a gel is formed so that the cooled product may be relatively soluble, the gel formation being a warning that the reaction has gone too far. Considerable variations of temperature and time of reaction are, however, possible, and control thereof determines to a substantial extent the properties of the product.

It is also possible to vary the proportion of constituents to a large degree. For example, widely different proportions of salts of the carbocyclic acids may be used, or they may be supplemented by other modifiers such as fatty acids, castor or linseed oil acids, or the like. The alkyd resins produced may also be modified by the introduction during the reaction or thereafter of other resins such as urea formaldehyde resins, phenol formaldehyde resins, coumarone or indene resins, or the like. In general, it may be said that the improved resins are subject to all the treatments conventionally applied to other alkyd resins.

Not only may one or more of the salts of the above acids be added in carrying out the reaction, but the acids or their esters of polyhydric alcohols may take part in the reaction as described in our applications Serial Nos. 332,286 and 333,422, filed, respectively April 29, 1940 and May 4, 1940.

In carrying out the reactions, mechanical agitation is generally desirable.

Typical lacquers are the following:

3 grams of resin prepared as above, 6 grams of ½ second nitrocellulose and 3.6 grams of tricresyl phosphate may be dissolved in a mixture of ethyl acetate, amyl acetate and benzene to a total volume of 50 cc. A good lacquer is thus produced showing, after seven days, good mandrel and scratch tests.

3 grams of the same resin plus 3.6 grams of the methyl ester of the above mentioned acids of an acid number of 170 with 6 grams of ½ second nitrocellulose may be dissolved in the solvent mixture mentioned above to a total volume of 50 cc. Again there is produced a good lacquer showing good mandrel and scratch tests.

A good cellulose acetate lacquer results from the solution of 0.5 gram of the above resin, 0.5 gram of dimethyl phthalate and 1.5 grams of high viscosity cellulose acetate in a solution of 50 cc. made up of a mixture of methyl cellosolve acetate (the commercial designation of ethylene glycol monoethyl ether acetate), acetone, dioxane (1:4 diethylene oxide) and benzene. A good lacquer also results from solution of 1 gram of the above resin and 1 gram of dimethyl phthalate and 3 grams of cellulose acetate of low viscosity in the same solvent to a volume of 50 cc. The above lacquers may have incorporated in them various pigments and dyestuffs with the production of very satisfactory lacquers. Dibutyl phthalate may be used in place of dimethyl phthalate, particularly when a large amount of resin or a high viscosity cellulose acetate is used.

Pigments and other materials may be readily incorporated in the above mixtures to secure compositions suitable for various purposes.

The use of the salts of the monobasic carbocyclic petroleum acids mentioned above is applicable to the modification of other alkyd resins such as those produced by the reaction of glycol, mannitol or sorbitol with phthalic anhydride or by the reaction of these polyhydric alcohols or glycerol either alone or in admixture with one or more polybasic acids such as succinic, maleic, tartaric or citric acids or anhydrides thereof used alone, in admixtures with each other, or in admixtures with phthalic anhydride. Since the petroleum acids specified above are quite inexpensive, the cost of suitably modified products for incorporation in coating or other compositions is substantially reduced.

The salts mentioned above may be involved in reactions including one or both of the acids or polyhydric esters of acids of the above mentioned carbocyclic type with polybasic acids.

In the following claims, where reference is made to a polybasic acid, it will be understood that the anhydride thereof is included, since, in various cases, the anhydride is the form commercially available or most desirably used.

What we claim and desire to protect by Letters Patent is:

1. The method of making a resin of the alkyd type comprising producing a reaction between a polyhydric alcohol, a polycarboxylic acid, and a metallic salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

2. The method of making a resin of the alkyd type comprising producing a reaction between glycerol, phthalic anhydride, and a metallic salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

3. The method of making a resin of the alkyd type comprising producing a reaction between glycerol, phthalic anhydride, and a cobalt salt of a mixture of acids derived from petroleum and of the class having the generic formula $$C_nH_{2n-x}O_2$$

in which $x$ is a number of the group consisting of 4, 6, 8 and 10 and in which $n$ ranges from 14 to 29.

4. A resin of the alkyd type comprising the reaction products of a polyhydric alcohol, a polycarboxylic acid, and a metallic salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

5. A resin of the alkyd type comprising the reaction products of glycerol, phthalic anhydride, and a metallic salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

6. A resin of the alkyd type comprising the reaction products of glycerol, phthalic anhydride, and a cobalt salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

7. A coating composition comprising a solvent and a resin of the alkyd type comprising the reaction products of a polyhydric alcohol, a polycarboxylic acid, and a metallic salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

8. A coating composition comprising a solvent and a resin of the alkyd type comprising the reaction products of glycerol, phthalic anhydride, and a metallic salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

9. A coating composition comprising a solvent and a resin of the alkyd type comprising the reaction products of glycerol, phthalic anhydride, and a cobalt salt of a mixture of acids derived from petroleum and of the class having the generic formula $C_nH_{2n-x}O_2$ in which $x$ is a number of the group consisting of 4, 6, 8 and 10 and in which $n$ ranges from 14 to 29.

GELLERT ALLEMAN.
JOHN HAROLD PERRINE.